United States Patent
Ennis

(10) Patent No.: US 7,563,525 B2
(45) Date of Patent: Jul. 21, 2009

(54) ELECTRIC REACTION TECHNOLOGY FOR FUELS PROCESSING

(75) Inventor: Bernard P. Ennis, Cedar Grove, NJ (US)

(73) Assignee: EGT Enterprises, Inc., Cedar Grove, NJ (US)

( * ) Notice: Subject to any disclaimer, the term of this patent is extended or adjusted under 35 U.S.C. 154(b) by 58 days.

(21) Appl. No.: 11/674,250

(22) Filed: Feb. 13, 2007

(65) Prior Publication Data

US 2007/0186470 A1      Aug. 16, 2007

Related U.S. Application Data

(60) Provisional application No. 60/773,613, filed on Feb. 15, 2006.

(51) Int. Cl.
  *H01M 8/04*      (2006.01)
  *C01B 3/24*      (2006.01)
  *C07C 4/04*      (2006.01)

(52) U.S. Cl. .............. 429/13; 48/127.9; 48/197 R; 423/445 R; 423/650; 429/17; 429/20; 585/537; 585/613

(58) Field of Classification Search .............. 423/648.1, 423/650, 651, 445 R; 219/209, 383, 384; 48/197 R, 127.9; 429/13, 17, 20; 585/537, 585/613
See application file for complete search history.

(56) References Cited

U.S. PATENT DOCUMENTS

| | | | |
|---|---|---|---|
| 1,220,391 A | 3/1917 | Bacon et al. | |
| 1,528,324 A | 3/1925 | Fischer | |
| 1,536,612 A * | 5/1925 | Lewis | 423/458 |
| 1,596,070 A | 8/1926 | Snelling | |
| 1,813,514 A | 7/1931 | Schmidt et al. | |
| 2,982,622 A | 5/1961 | Jahnig et al. | |
| 3,118,042 A * | 1/1964 | Parker | 219/406 |
| 3,156,734 A * | 11/1964 | Happel | 423/650 |
| 3,227,771 A * | 1/1966 | Happel et al. | 585/539 |
| 3,254,957 A | 6/1966 | Meiers et al. | |
| 3,514,264 A * | 5/1970 | Hans-Werner et al. | 422/193 |
| 3,793,438 A | 2/1974 | Gunnel et al. | |
| 4,410,504 A | 10/1983 | Galasso et al. | |
| 4,836,898 A * | 6/1989 | Noyes | 423/450 |
| 4,973,777 A * | 11/1990 | Alagy et al. | 585/403 |
| 5,100,638 A * | 3/1992 | Levin | 423/449.6 |
| 5,198,084 A | 3/1993 | Cha et al. | |
| 6,221,507 B1 | 4/2001 | Gewelber | |
| 2004/0006915 A1 * | 1/2004 | Renn | 48/197 R |
| 2004/0166055 A1 * | 8/2004 | Stickney et al. | 423/651 |
| 2004/0221507 A1 | 11/2004 | Wu et al. | |
| 2004/0265223 A1 * | 12/2004 | Etievant et al. | 423/650 |

* cited by examiner

*Primary Examiner*—Wayne Langel
(74) *Attorney, Agent, or Firm*—Schnader Harrison Segal & Lewis, LLP

(57) ABSTRACT

A method and apparatus for producing hydrogen is disclosed wherein a hydrocarbon gas is fed into an electric reaction technology system to decompose the hydrocarbon gas to hydrogen gas and carbon solids. The electric reaction technology system comprises one or more heating zones, wherein each heating zone comprises one or more heating stations and each heating station comprises one or more heating screens followed by a final near-equilibrium attainment zone without additional heat input. After passing the hydrogen gas through the electric reaction technology system the hydrogen gas and any remaining carbon solids and hydrocarbon gas are cooled. The hydrogen gas and any remaining carbon solids and hydrocarbon gas flow through a scrubber, filter, drier or other phase separation system to remove substantially all of the carbon, leaving hydrogen product. The electric reaction technology system can also be used to pyrolyze hydrocarbons.

37 Claims, 6 Drawing Sheets

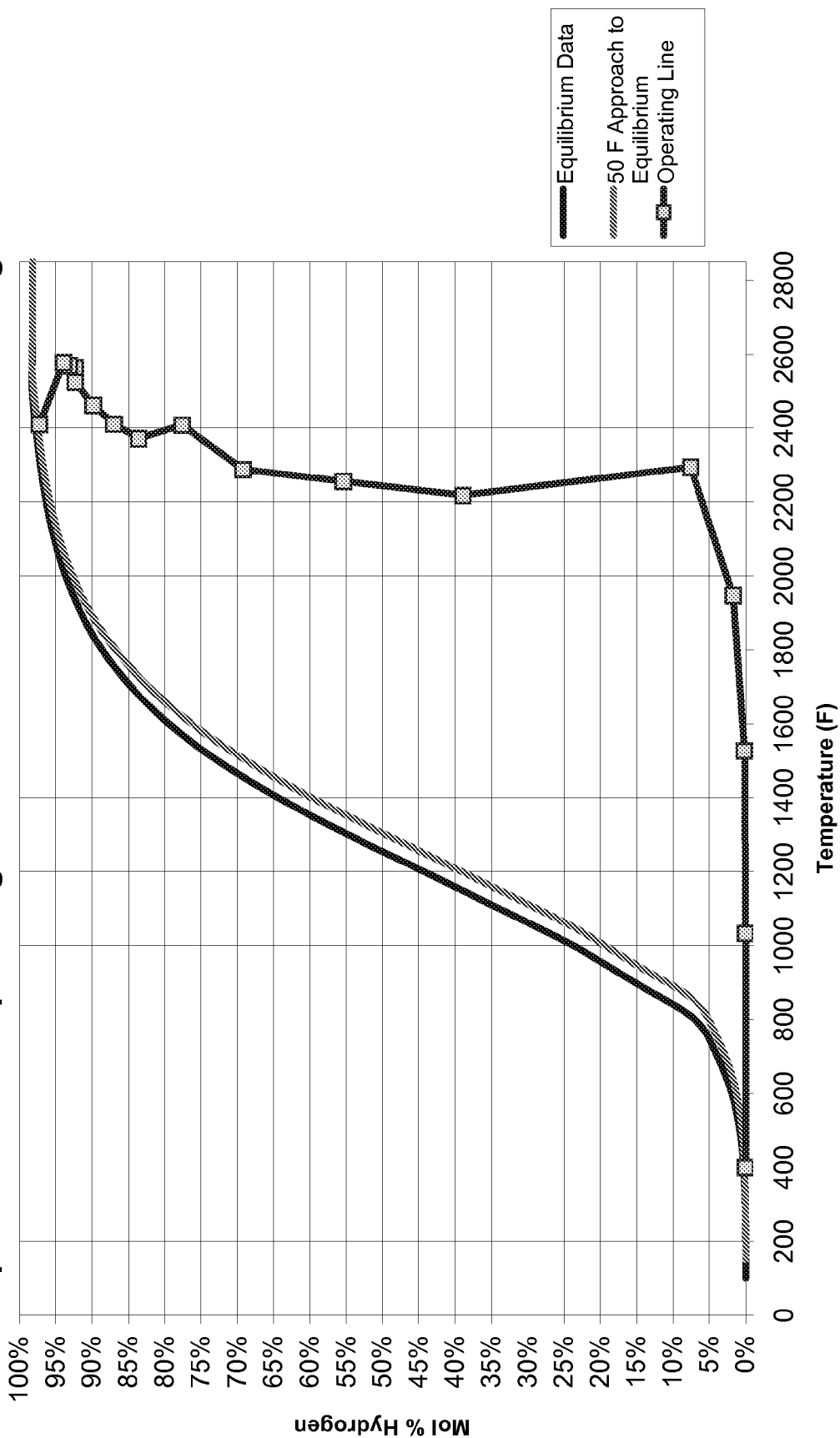

ELECTRIC REACTION TECHNOLOGY FOR FUELS PROCESSING

This application is based on, and claims priority to, provisional application having Ser. No. 60/773,613, having a filing date of Feb. 15, 2006, entitled Electric Reaction Technology for Pollution-Free Fuels Decarbonization.

BACKGROUND OF THE INVENTION

Carbon dioxide is produced when burning any hydrocarbon fuel. Additional carbon dioxide is produced by the chemical industry when hydrocarbons are used as feedstocks for catalytic steam reforming, partial oxidation and water gas shift reaction processes to manufacture hydrogen-containing synthesis gas. Little has changed in the last 50 years and almost all this carbon dioxide finds its way into the atmosphere. In recent years, carbon dioxide has been identified as a contributor to global climate change. Governments and corporations have proposed many methods to reduce or manage atmospheric carbon dioxide emissions. Furthermore, major efforts have been mounted to produce hydrogen more economically, since it burns cleanly, producing only water (as steam) and heat as combustion products. All approaches to move toward environmentally friendly fuels entail great complexity and expense.

The only way to completely eliminate the production of carbon dioxide when combusting hydrocarbons would be to:
1. Apply heat to hydrocarbons to cause decomposition to elemental carbon and molecular hydrogen;
2. Separate the hydrogen and carbon; and
3. Either burn the hydrogen with air or oxygen forming high temperature steam as a useful source of heat or electrochemically convert the hydrogen into water and electricity in a fuel cell.

In such processes, the heating value of carbon combustion would be unrealized as useful heat. This loss of carbon heating value would nominally require twice the fuel to produce a given amount of hydrogen or process heat. However, carbon solids recovered in the process could be marketed or stored (sequestered) much more economically than by 'end-of-the-process' capture and sequestration of carbon dioxide.

Accordingly, a need exists for a method and apparatus to produce hydrogen in an efficient manner with limited carbon dioxide emission.

SUMMARY OF THE INVENTION

Embodiments of the invention provide a method and apparatus for producing hydrogen wherein a hydrocarbon gas is fed into an electric reaction technology system to decompose the hydrocarbon gas to hydrogen gas and carbon solids. The electric reaction technology system comprises one or more heating zones, wherein each heating zone comprises one or more heating stations and each heating station comprises one or more heating screens. (The term "screen" as used herein means a meshed wire component.) Preferably, a final near-equilibrium attainment zone without additional heat input follows either the complete ERT heating phase or one or more stages of the ERT heating phase. In an illustrative embodiment of the invention, the attainment zone comprises a carbon reaction chamber. Preferably, the temperature of the hydrogen and any remaining carbon and hydrocarbons leaving the electric reaction technology system is in the range of about 2000° F. to about 2700° F. After passing the hydrogen gas through the electric reaction technology system, the hydrogen gas and any remaining carbon solids and hydrocarbon gas are cooled. The hydrogen gas and any remaining carbon solids and hydrocarbon gas then flow through a phase separation system, such as a scrubber, filtration or drying system for example, to remove substantially all of the carbon, leaving hydrogen product.

In an illustrative embodiment of the invention, heat generated from the electric reaction technology system is used to heat the incoming hydrocarbon gas feed. Preferably, the hydrocarbon gas feed is heated by the heat generated from the electric reaction technology system to a temperature in the range of about 400° F. to about 1200° F. This can be accomplished by flowing the hydrocarbon gas into a heat exchanger, and flowing the heated hydrogen gas and any remaining carbon solids and hydrocarbon gas through the heat exchanger to heat additional incoming hydrocarbon gas. The hydrocarbon gas flow may also be preheated prior to feeding it into the electric reaction technology system or heat exchanger. In an exemplary embodiment of the invention, the temperature increase of the hydrocarbon gas flow from the pre-heating step is in the range of about 250° F. to about 600° F.

In an illustrative embodiment of the invention, the heated hydrogen gas and carbon solids exiting each heating zone in the electric reaction technology system flow through a carbon removal component to remove some or all of the carbon solids.

The heated hydrogen gas and any remaining carbon solids and hydrocarbon gas may be passed through a quench system after exiting the electric reaction technology system and prior to entering the phase separation system. Water may be added to the hydrogen gas and any remaining carbon solids and hydrocarbon gas in the phase separation system to create a slurry containing substantially all of the carbon.

In a further embodiment of the invention, at least a portion of the heated hydrogen gas and any remaining carbon solids and hydrocarbon gas exiting the heat exchanger is recycled into the hydrocarbon gas flow. Preferably the ratio of recycled hydrogen to non-recycled hydrogen is in the range of about 2:1 to about 4:1, and more preferably in the range of about 2.5:1 to about 3.5:1. The hydrogen gas that will be recycled is passed through a recycle compressor to compensate for pressure losses through the system. Hydrogen gas from the phase separation system may also be recycled into the hydrocarbon gas flow. This can be done either instead of recycling hydrogen gas from the heat exchanger or in addition to it.

The spacing of screens in the ERT system and the residence times are important factors in optimizing the process. In a particular embodiment of the invention, the spacing between heating screen stations increases in the gas flow direction. In a further embodiment of the invention, the spacing between heating screen station varies continuously after the first zone to maintain substantially isothermal conditions. Illustrative embodiments of the invention provide residence times that increase for each heating station; and residence times that decrease with each heating screen station.

The heat duty delivered by each heating screen station may be substantially equal or may vary from station to station. In further embodiments, the heat duty delivered by each subsequent zone decreases, or the heat duty delivered by all zones is constant. Additionally, in an illustrative embodiment of the invention the heat delivered by each heating screen station is substantially constant within each zone.

The temperature may vary between heating zones. In a particular embodiment of the invention, the difference between the temperature of the flow entering a heating screen station and the temperature of the flow exiting the heating station is in the range of about 125° F. to about 175° F.; in other embodiments the heating input may cause a temperature rise of 400° F. or more The electric reaction technology system can also be used to pyrolyze hydrocarbons.

DESCRIPTION OF THE DRAWINGS

The invention is best understood from the following detailed description when read with the accompanying drawings.

FIG. 6 is a graph showing equilibrium and operating curves for a hydrogen production system having a single pass configuration according to an illustrative embodiment of the invention.

DETAILED DESCRIPTION OF THE INVENTION

Figure 1:
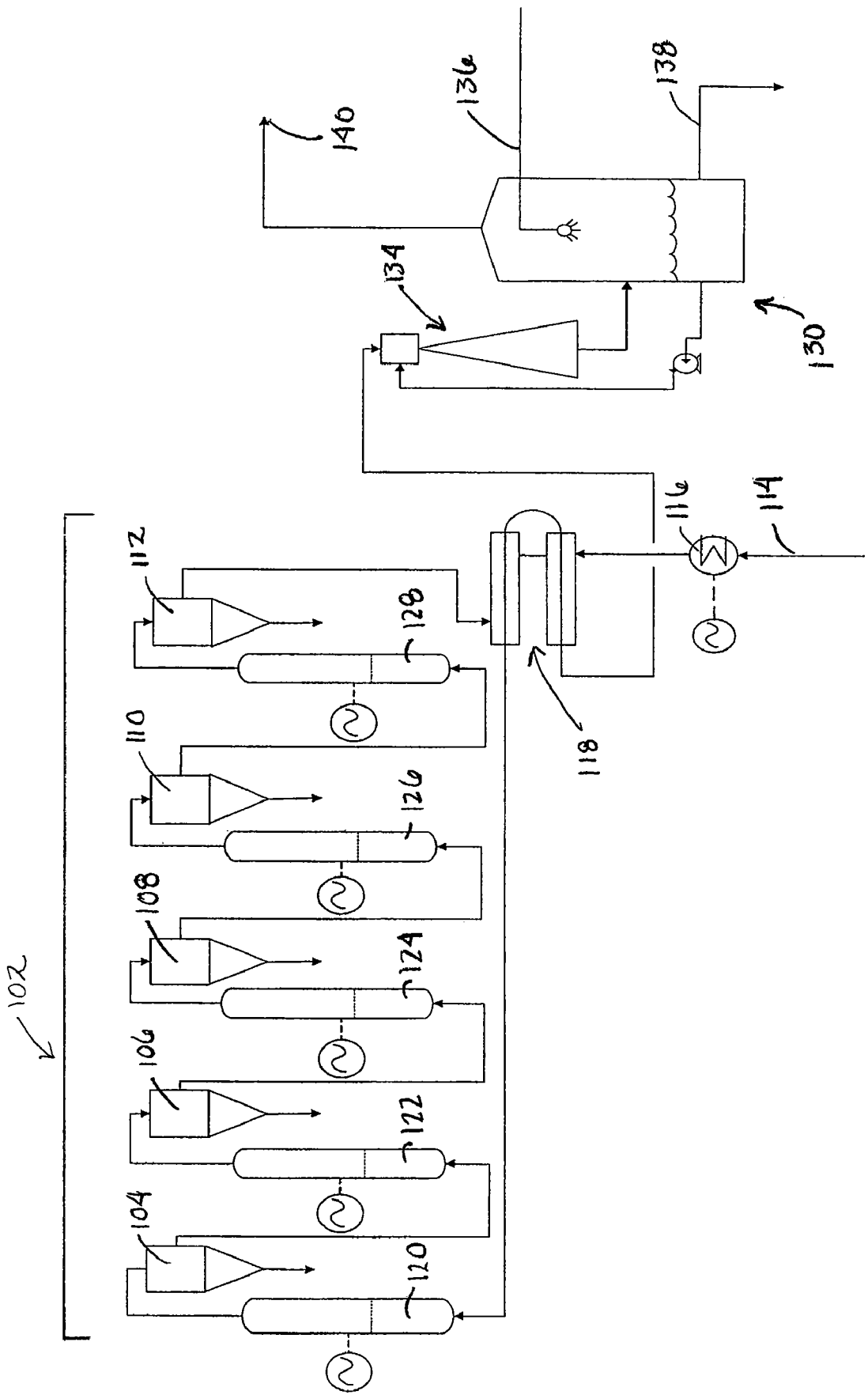
FIG. 1 depicts a stagewise hydrogen production system according to an illustrative embodiment of the invention.

Disclosed is an Electric Reaction Technology (ERT) process and apparatus directed to the production of hydrogen and carbon solids by decomposition of methane or natural gas. The ERT apparatus may also be used for pyrolysis processes. When used for the former, the ERT process may also be called a fuel decarbonization process. The process employs electric resistance heaters capable of adaptation to the selective decomposition of hydrocarbons and filtration/separation equipment capable of effective filtration/separation under very high carbon loading.

As the source of electricity may be an environmental concern, such a plant could be situated near an economical and eco-friendly wind farm to provide the necessary electricity. There would be little or no resulting carbon dioxide or other greenhouse gas emissions from either one of these processes, as compared to conventional fossil fuel technologies.

Hydrocarbon decomposition, also known as fuels decarbonization, has been neglected as a potential route for commercial hydrogen and carbon solids manufacture and as a process to mitigate global warming. Methane, the largest constituent in natural gas, is also the hydrocarbon with the highest hydrogen to carbon ratio. It therefore has the potential to produce relatively more hydrogen than any other hydrocarbon. Methane decomposition has simple one-step chemistry; and superior thermodynamics in that the chemical reaction requires only 11.3 Kcal/mol of hydrogen, the lowest known process energy consumption per unit of hydrogen produced.

| Methane Decomposition by Heating: (one non-catalytic step) | |
| --- | --- |
| Methane Decomposition | $CH_4 \rightarrow C + 2H_2$ |
| Process Energy/Unit of Hydrogen | +11.3 Kcal/mol hydrogen |

This compares favorably with methane reforming by steam comprising a two-step, two-catalyst process that requires 18.8 Kcal/mol of hydrogen.

| Methane Reforming by Steam: (two catalytic process steps) | |
| --- | --- |
| Steam Reforming | $CH_4 + H_2O \rightarrow CO + 3H_2$ |
| Water-Gas Shift | $CO + H_2O \rightarrow CO_2 + H_2$ |
| Overall Reaction | $CH_4 + 2H_2O \rightarrow CO_2 + 4H_2$ |
| Process Energy/Unit of Hydrogen | +18.8 Kcal/mol hydrogen |

The first reaction (steam reforming) is highly endothermic and the mols of products exceed the mols of reactants, therefore, the reaction proceeds to completion at high temperature and low pressure. The second reaction (water-gas shift) is mildly exothermic and favors low temperature but is unaffected by pressure. The composition of the products depend upon the process conditions, including temperature, pressure, and excess steam, which determine equilibrium, as well as velocity through the catalyst bed, which determines the approach to equilibrium. All other proposed processes have far-inferior thermodynamics, e.g. electrolysis processes require approximately +106 Kcal/mol of hydrogen.

Methane decomposition schemes proposed and implemented by others either have very high capital costs arising from the complexity of high temperature equipment designs or have failed to perform reliably at commercial scale. Thus, it is apparent why industry deploys steam methane reforming for the majority of 'on-purpose' hydrogen production.

Hydrogen has long been an important gaseous raw material for the chemical and petroleum industries. Steam methane reformers are the basis of over 90% of the world's on-purpose hydrogen production. Presently such plants cost approximately $100 million to produce 100 MM SCFD of hydrogen. Particular embodiments of the disclosed methane decomposition plant are much simpler in concept and would be expected to cost substantially less. Operating margin analysis for feed and fuel and carbon solids at $4.50/Million Btu shows that the disclosed process could breakeven with electricity priced as high as $95.50 per Megawatt-hour. Conversely, with feed and fuel remaining at $4.50/Million Btu and electricity available at $40 per Megawatt-hour, hydrogen could be produced at breakeven for as little as $5.78 per Million Btu.

Carbon black is used primarily by the tire industry for the production of vulcanized rubber; however, it is also used as a black pigment for inks and paints. The worldwide demand for carbon black is predicted to increase 4% per annum through 2008. With respect to a hypothetical project to produce 50,000 mtpa of carbon black, the following estimates apply:

| | |
| --- | --- |
| Natural Gas Feedstock | 10.5 million standard cubic feet per day |
| Electricity Consumption | 18.3 megawatts |
| 97.3 mol % Hydrogen Product | 5,575 pounds per hour |
| Specific Electricity Consumption | 2.91 kWh per kilogram of carbon black; or 20.8 kWh per thousand SCF of hydrogen |

Advantageously, particular embodiments of the disclosed invention may provide:
  Lower capital cost;
  Simplicity of design, operations and maintenance; and
  Margins between market and breakeven costs for electricity, hydrogen and carbon black;
  Analogous advantages that would apply for production from other hydrocarbons.

The basic principle of the ERT process will now be described. When methane (or natural gas or other hydrocarbons) is heated above a certain temperature, it will decompose to hydrogen gas and carbon solids and absorb the heat of reaction as shown in the chemical equation above. The rate of decomposition increases with temperature. However, the extent of decomposition will reach an equilibrium level dependent on the temperature level. After the electrically heated screens within the ERT heat the gas, decomposition will follow which will tend to cool down the gas/carbon mixture. Since the time for heating is very short relative to the decomposition time, a space is allowed for reaction to take place after each heating stage. The ERT process is preferably constructed with multiple stages of heating and reaction steps.

Following are illustrative configurations designed with different design constraints. Each description only highlights the main differences between the various configurations of the equipment required for each. The illustrative configurations discussed herein feature an optional quench cooling of the product carbon/gas mixture. Several of the configurations feature an optional pre-heater in order to heat the natural gas feed to a higher temperature to speed up the reaction, and accordingly the production of carbon and hydrogen; preheating also serves to minimize the electrical requirements that provide the heat that drives the chemical reactions. Due to concerns over the settling out of carbon particles within the ERT unit cross sectional flow area and flow rate have been selected to maintain fluid velocity well within the acceptable safe area of design.

Figure 3:
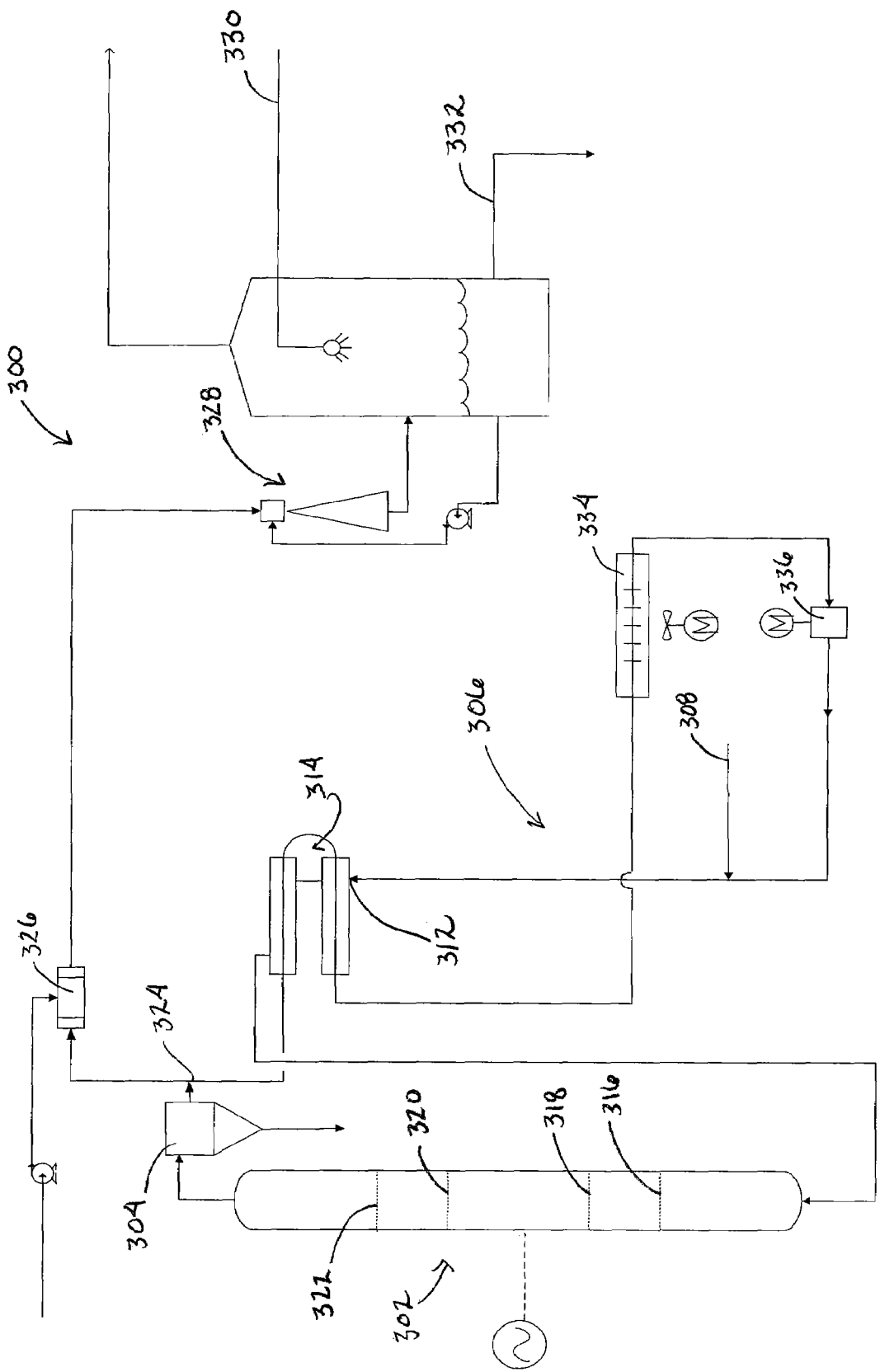
FIG. 3 depicts a hydrogen production system having a recycle configuration according to an illustrative embodiment of the invention.
Figure 5:
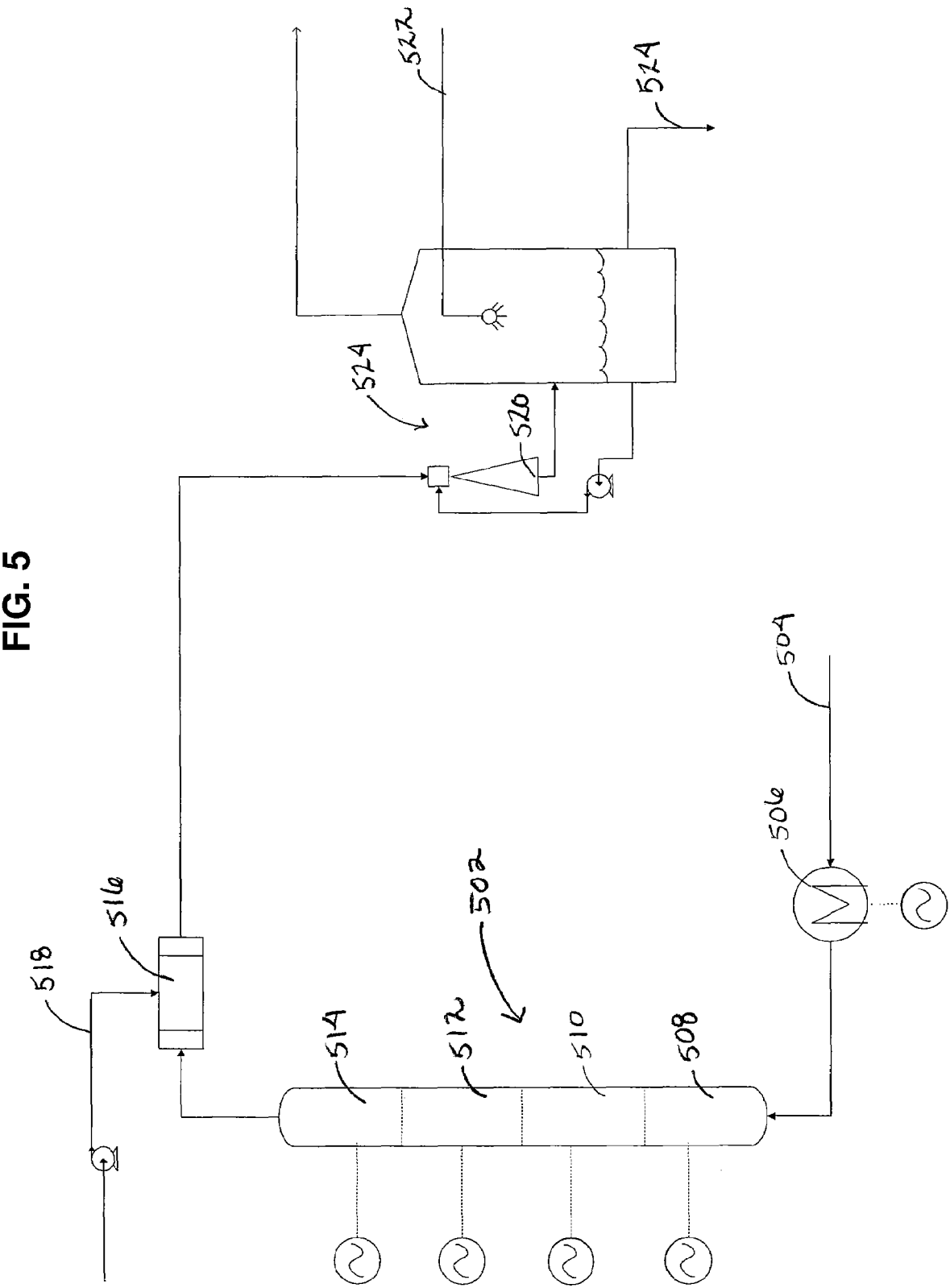
FIG. 5 depicts a single pass hydrogen production system according to an illustrative embodiment of the invention.

The illustrative embodiments depicted in FIGS. 1, 3 and 5 show an ERT unit disposed vertically. The unit can also be disposed horizontally or at an angle to the normal.

In an illustrative embodiment of the invention, the ERT unit is set at approximately 200 KW input to the ERT. In a preferred embodiment, the ERT is a plug flow reactor and consists of four (4) separate heating zones, each zone containing four (4) screen heater stations. This will be referred to as the Full Conventional configuration and will be discussed in more detail below.

FIG. 1 depicts an illustrative embodiment of the invention referred to as "Stagewise Configuration". This Stagewise Carbon Removal configuration features a single ERT unit 102 at its core as well as several finalizing reaction chambers 104, 106, 108, 110, 112. The ERT unit is a single pass arrangement, meaning that the products are not recycled back into the process. This configuration is based upon running the reaction adiabatically while utilizing the product to heat the fresh natural gas feed 114. A hydrogen purity of 95.1 mol % is potentially attainable with this particular design. The main design constraint that was taken into consideration while creating this configuration dealt with the temperature of the carbon/gas mix exiting each heating screen station. The goal was to find a design in which the temperature of the carbon/gas mix leaving each heating zone maintained approximately a 50° F. approach to the equilibrium temperature, meaning that each of the reaction chambers was designed in such a way that the exit temperature was at least greater than about 50° F. than the equilibrium temperature at the corresponding exit concentration of hydrogen. Calculated data is provided in Table 1 at nominal 300 pounds per square inch system pressure. This data is common to all the illustrative embodiments described herein. The methods and systems described herein are applicable at higher and lower pressures to be selected for each instance of use by designers skilled in the art.

TABLE 1

DATA FOR EQUILIBRIUM CURVES

| Equilibrium Data | | 50 F. Approach | |
| --- | --- | --- | --- |
| Temperature (° F.) | Mol Fraction Hydrogen | Temperature (° F.) | Mol Fraction Hydrogen |
| 2800 | 0.98169 | 2850 | 0.98169 |
| 2700 | 0.98169 | 2750 | 0.98169 |
| 2600 | 0.98169 | 2650 | 0.98169 |
| 2500 | 0.98169 | 2550 | 0.98169 |
| 2400 | 0.97710 | 2450 | 0.97710 |
| 2300 | 0.97098 | 2350 | 0.97098 |
| 2200 | 0.96275 | 2250 | 0.96275 |
| 2100 | 0.95153 | 2150 | 0.95153 |
| 2000 | 0.93614 | 2050 | 0.93614 |
| 1900 | 0.91496 | 1950 | 0.91496 |
| 1800 | 0.88593 | 1850 | 0.88593 |
| 1700 | 0.84638 | 1750 | 0.84638 |
| 1600 | 0.79423 | 1650 | 0.79423 |
| 1500 | 0.72679 | 1550 | 0.72679 |
| 1400 | 0.64405 | 1450 | 0.64405 |
| 1300 | 0.54767 | 1350 | 0.54767 |
| 1200 | 0.44276 | 1250 | 0.44276 |
| 1100 | 0.33940 | 1150 | 0.33940 |
| 1000 | 0.23741 | 1050 | 0.23741 |
| 900 | 0.15248 | 950 | 0.15248 |
| 800 | 0.06995 | 850 | 0.06995 |
| 700 | 0.03854 | 750 | 0.03854 |
| 600 | 0.01879 | 650 | 0.01879 |
| 500 | 0.00789 | 550 | 0.00789 |
| 400 | 0.00273 | 450 | 0.00273 |
| 300 | 0.00073 | 350 | 0.00073 |
| 200 | 0.00013 | 250 | 0.00013 |
| 100 | 0.00001 | 150 | 0.00001 |

The natural gas feed enters a pre-heater 116, preferably at a temperature of about 90° F. and exits the pre-heater, preferably at a temperature of about 400° F. The natural gas feed then passes through a feed/product exchanger 118. This is a head to tail heater that utilizes the heat of the product carbon/gas mixture to heat the natural gas feed, preferably to a temperature of about 1000° F. The natural gas feed proceeds into the first heating screen station 120 of the ERT unit. A screen station may include one or more screens. The term "zone" will also be used herein. A zone includes one or more screen stations and is characterized by an individual power source. Upon leaving the first heating zone 120, the carbon/gas mixture has preferably increased to a temperature over about 2250° F. After passing through each heating zone 120, 122, 124, 126, 128, the carbon/gas mixture passes through reaction and carbon removal chambers 104, 106, 108, 110, 112, respectively. These carbon product removal chambers will allow for easy sampling of the carbon formed throughout the ERT unit. Each subsequent heating zone gradually heats the remaining carbon/gas mixture in order to increase the reaction rate, and thus the rate at which carbon and hydrogen are produced. The flow through the ERT unit can be said to be once through, meaning that the products are not recycled back into the system after leaving the ERT unit. After passing through the fifth heating screen station 128, the carbon/gas mixture preferably exits the ERT unit at a temperature of approximately 2250° F. and passes through final chamber 112 where it auto-cools to about 2160° F. The carbon/gas mixture then passes through several additional pieces of equipment, or the finalizing stage 130.

In this illustrative embodiment, the flow channel of each ERT unit is about 5 feet in length and is comprised of five heating zones 120, 122, 124, 126, 128 delivering a total heat input of about 200 kW. The Stagewise Carbon Removal configuration will preferably be fabricated in such a way that each individual heating zone is immediately followed by a large carbon removal chamber 104, 106, 108, 110, 112. Each of the five ERT units preferably consists of a single heating screen station, each delivering a different heat duty to the system. Since each ERT zone is a separate unit, this simplifies electrical design and controls. Immediately following each ERT unit 120, 122, 124, 126, 128 is a carbon removal chamber 104, 106, 108, 110, 112 that provides both a reaction volume and a settling location for the carbon produced. Each removal chamber is refractory-lined and water-jacketed and features continuous carbon cooling and removal. Removing the carbon from the heating duty of the system shortly after it is produced reduces energy input. Each of the heating zones in the respective ERT units will deliver varying amounts of heat to the system. Once again, this value is determined based upon the design constraint.

The finalizing stage is where the carbon/gas mixture is cooled and separated. In an illustrative embodiment of the invention, first, the carbon/gas mixture is cooled as it passes through a head to tail heat exchanger. The products will exit the exchanger, preferably at a temperature of about 500° F. Then the products go through a phase separator 134, such as a Venturi scrubber, where water 136 is added, thus cooling the products and creating slurry. The carbon settles on the bottom of the apparatus and exits as slurry 138. Samples can then be taken before sending the product carbon slurry on for drying and final carbon product production. The remaining gas leaving the top of the phase separation apparatus comprises the hydrogen product.

Figure 2:
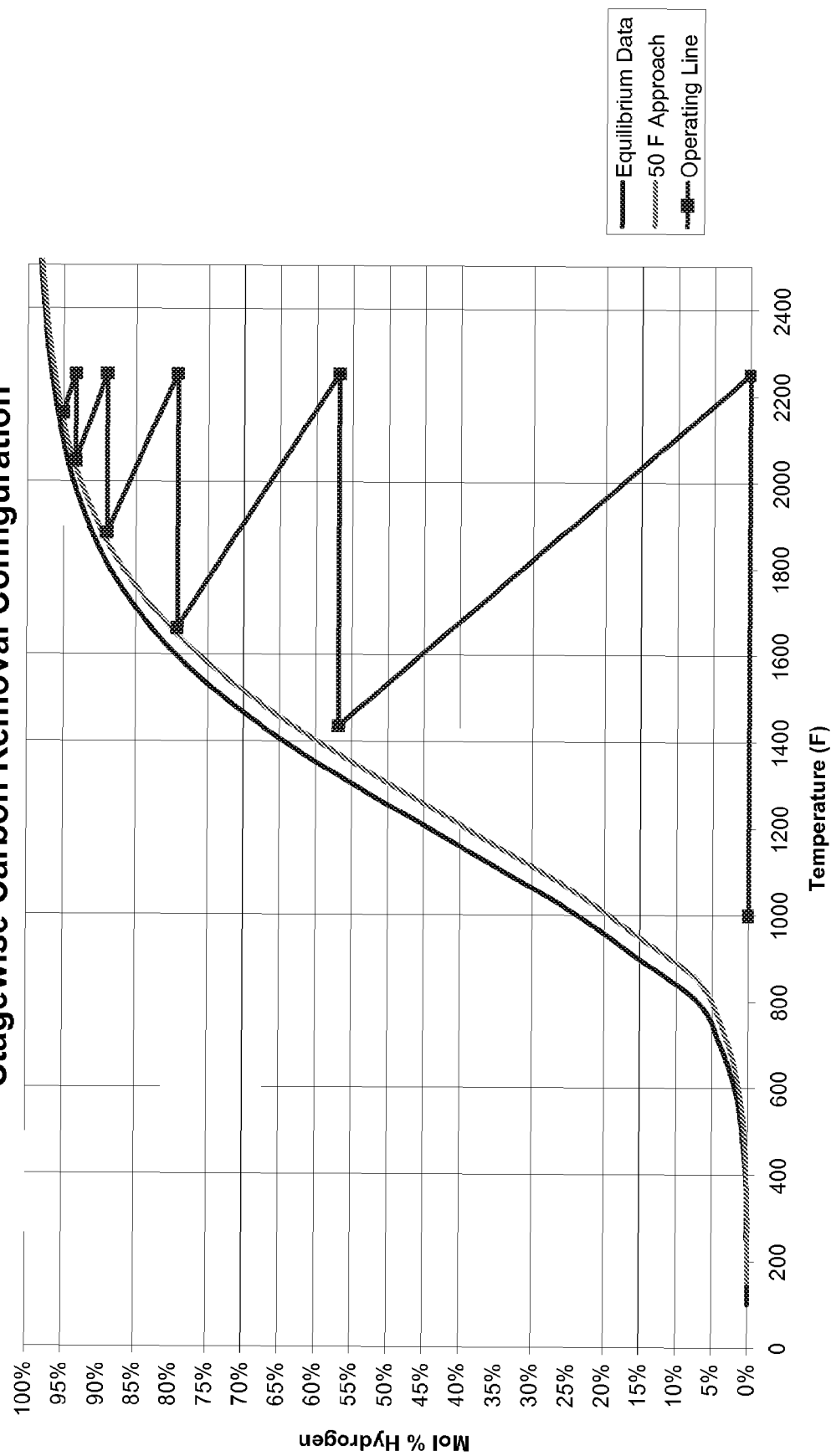
FIG. 2 is a graph showing equilibrium and operating curves for a stagewise hydrogen production system according to an illustrative embodiment of the invention.

Calculated volume flow, heat duty, residence time, reaction chamber outlet temperature and outlet gas composition are shown in Table 2 for a five-section Stagewise carbon removal configuration. The associated equilibrium and operating curves are shown in FIG. 2.

gen. Calculations show 95% hydrogen purity is potentially attainable with five stations as shown in FIG. 2.

The next illustrative embodiment is referred to as a "Recycle Configuration" and is shown in FIG. 3. The Recycle configuration 300 is based upon recycling a portion of the reactor effluent back to the feed end of the ERT unit. This will enable the use of a single heating zone to be operated as the "final stage of ERT process." A simple ERT design may be used to obtain desired results. The Recycle configuration consists of an ERT unit 302, reaction chamber 304, and a recycle system 306. A hydrogen purity of 95.5 mol % is potentially attainable with this design. The main design constraint dealt with controlling the temperature of the carbon/gas mixture exiting each heating screen station.

Following is a description of a recycle configuration according to an illustrative embodiment of the invention. The Recycle configuration features a loop design. The natural gas feed 308 enters the system, preferably at a temperature of about 90° F. and is injected into the recycle stream at the feed side inlet 312 of a feed/product exchanger 314. The exchanger 314 utilizes the heat of the recycle gas mixture to heat the natural gas feed and the recycle gas/recycle mix, preferably to a temperature of about 1000° F. The mixed feed proceeds into the first heating screen station 316 of the ERT unit. Upon leaving the first station 316, the carbon/gas mixture has preferably increased to a temperature over 1600° F. Each subsequent heating screen station 318, 320, 322 gradually heats the carbon/gas mixture to a higher temperature in order to increase the reaction rate. After passing through the fourth heating screen station 322, the carbon/gas mixture exits the ERT unit 302 at a temperature of preferably nearly 2700° F. and flows to the reaction chamber where it auto-cools to about 2200° F.

In this illustrative embodiment, the ERT unit 302 itself is 12 feet in length and is comprised of four heating screen stations 316, 318, 320, 322, preferably delivering a total heat input of about 80 kW. The Recycle ERT unit is preferably substantially vertical to allow the gas flow through the ERT unit 302 to carry the carbon with it, preventing or minimizing build up of carbon on the screens or on the walls of the ERT unit 302. The ERT unit 302 preferably has a first heating screen station 316 where preheating takes place, three addi-

TABLE 2

STAGEWISE CARBON REMOVAL CONFIGURATION

| | Section | Volume (ft³) | Volumetric Flow In (ft³/hr) | Volumetric Flow Out (ft³/hr) | Heat Duty (kW) | Time (sec) | Outlet Temperature (° F.) | Outlet Mol Fraction Hydrogen |
|---|---|---|---|---|---|---|---|---|
| ERT Section | 1 | 15.037 | 4603 | 8258 | 83.0 | 8.418 | 1436 | 0.568 |
| | 2 | 8.590 | 6431 | 8813 | 51.7 | 4.057 | 1662 | 0.790 |
| | 3 | 4.712 | 7622 | 8957 | 35.2 | 2.046 | 1882 | 0.889 |
| | 4 | 2.827 | 8290 | 8968 | 21.3 | 1.180 | 2048 | 0.933 |
| | 5 | 1.445 | 8629 | 8916 | 11.5 | 0.593 | 2160 | 0.951 |

There are several potential advantages to the Stagewise Carbon Removal configuration:

High hydrogen purity can be achieved.

Carbon is removed after each individual heating screen station, thus decreasing the required heat inputs to each ERT unit.

This particular configuration only consists of five heating screen stations; this configuration can be expanded to include six or more heating screen stations. Fewer heating screens can also be used but will generally result in lower purity hydrotional heating screen stations 318, 320, 322 where the reaction takes place. The primary function of the first heating screen station 316 is to heat the mixed gas feed in order to increase the rate of reaction. Minimal amounts of carbon and hydrogen are produced during this stage due to the slow rate of reaction. Therefore, the spacing between the first screen station 316 and the second screen station 318 does not need to be very large, however, due to design constraints, as well as trying to maximize the hydrogen purity, the spacing between the first and second screen stations 316, 318 is preferably moderately large. Once the carbon/gas mixture reaches temperatures over 1500° F., noticeable amounts of carbon and hydrogen are produced: consequently, the remaining heating screen stations 318, 320, 322 preferably have larger spacing between them. Preferably, the heat delivered by each heating screen station does not vary; each heating screen station in both the pre-heating area and reaction area ideally delivers 20 kW to the system in this particular embodiment. By varying the spacing between each heating screen station throughout the entire ERT unit 302, higher hydrogen purity will likely be achieved.

The reaction mix from the ERT 302 unit flows to the reaction chamber 304. The chamber 304 adds the residence time needed for high hydrogen purity to be achieved. By the time the gas leaves the reaction chamber 304, the temperature of the carbon/gas mixture has preferably dropped to approximately 2200° F. The carbon/gas mixture then proceeds to go through a splitter (not diagrammed, but indicated at 324) where the product stream is separated. In an illustrative embodiment of the invention, approximately 40% of the products and the mixture is then sent through a quench cooling system 326 where they are cooled, preferably to about 500° F. with quench water. The products then go through a phase separator 328, such as a Venturi scrubber, where the carbon/gas mixture is cooled further by contacting with a circulating slurry of water and carbon. Make up water 330 is added to the phase separation system 328, thus cooling the products and creating slurry. Other compatible cooling and separation systems, are within the spirit and scope of the invention. The product carbon settles on the bottom of the apparatus and exits as slurry at outlet area 332. Samples can then be taken before sending the product carbon slurry on for drying and final carbon product production. The remaining 'cleaned gas' leaving the top of the phase separation apparatus substantially carbon-free, containing a mixture of methane and hydrogen comprises the hydrogen product.

The remaining 60% of the reaction chamber effluent is the recycle gas. It passes through the feed/product exchanger 314 where it is cooled by the feed and recycle mix stream preferably to about 900° F. The huge drop in temperature is due to the fact that the heat of the product stream is used to heat the feed stream, which is much cooler (about 200° F.). The recycle mixture is then passed through an air cooler 334 where it is preferably cooled to about 200° F. before it passes through a compressor 336, which compresses the recycle stream to the required feed inlet pressure. The carbon/gas recycle mixture is then injected with fresh natural gas after passing through the compressor 336.

Figure 4:
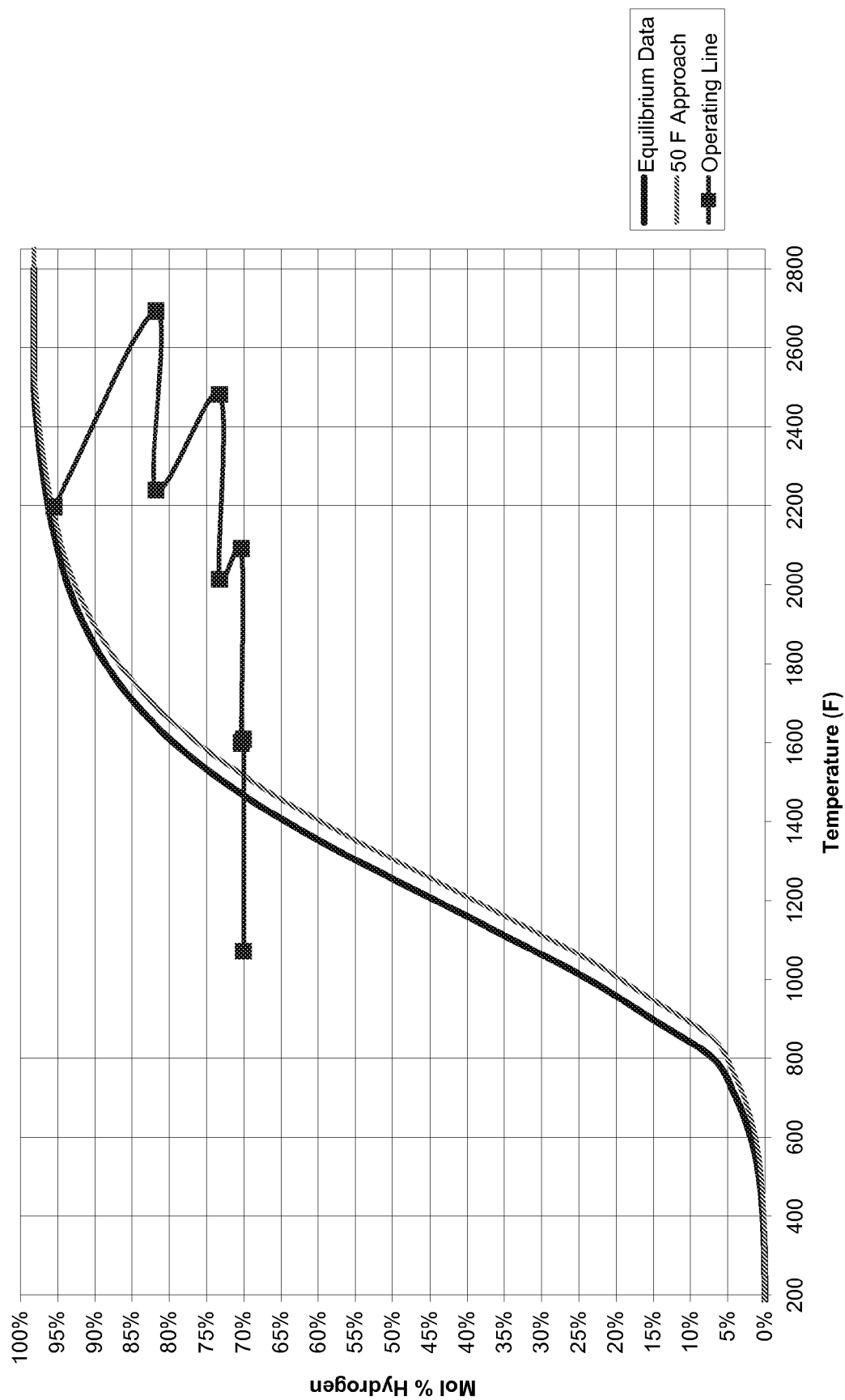
FIG. 4 is a graph showing equilibrium and operating curves for a hydrogen production system having a recycle configuration according to an illustrative embodiment of the invention.

Table 3 shows calculated volumes, heat duties, residence times, outlet temperatures and compositions for a four-section Recycle Configuration system. The associated equilibrium and operating curves are shown in FIG. 4.

The Recycle configuration has several potential advantages:

Very high hydrogen purity can be achieved due to the gas mixture entering the ERT unit at a very high temperature and already containing hydrogen. The finishing reaction chamber at the end of the ERT unit also contributes to the high hydrogen purity that can potentially be achieved. The large finishing reaction chamber adds residence time to the system, meaning that the reaction has a longer time to progress, thus resulting in more conversion.

The ERT unit itself can be moderately sized and priced.

Uniform heat delivered by each heating screen station can help to simplify the electrical controls and thereby may reduce costs compared to variable heat input configurations.

The Recycle configuration can operate over a wide range of desired outlet conditions by varying the recycle ratio and overall heat input.

FIG. 5 depicts an illustrative embodiment of a system referred to as a "Full Conventional Configuration." The Full Conventional configuration features a single, large ERT unit 502 and the flow or reactant or reaction mix is once through, meaning that the products are not recycled back into the process. This configuration is based upon the concept of minimizing reaction time, and consequently reaction volume, by reaching a high reaction temperature (over 2500° F.) quickly and running most of the reaction as close to isothermal conditions as possible. A hydrogen purity of 97.2 mol % is potentially attainable with this particular design. The main design constraint dealt with temperature of the carbon/gas mixture exiting each heating screen station. Preferably, the range of the temperature of the carbon/gas mixture leaving each heating screen station is within a small range of the temperature of the carbon/gas mixture entering that heating screen station (approximately 150° F.). By maintaining high temperature, the rate of reaction is maximized and the residence time minimized.

The overall system design can be relatively simple. Natural gas feed 504 enters a small pre-heater 506, preferably at a temperature of about 90° F. and is preferably heated to a temperature of about 400° F. The natural gas feed proceeds into the ERT unit 502. Upon leaving a first screen station within heating zone 508, the carbon/gas mixture has preferably increased to a temperature over 1000° F. Each subsequent heating screen station in zone 508, gradually heats the carbon/gas mixture to the target isothermal zone temperature range of 2200° F. to 2500° F. in order to increase the reaction rate, and thus the rate at which carbon and hydrogen are produced. After passing through the last heating screen station, the carbon/gas mixture preferably exits the ERT unit 502 at a temperature of about 2600° F. and flows to the finalizing

TABLE 3

RECYCLE CONFIGURATION

|  | Section | Volume (ft³) | Volumetric Flow In (ft³/hr) | Volumetric Flow Out (ft³/hr) | Heat Duty kW | Time (sec) | Outlet Temperature (° F.) | Outlet Mol Fraction Hydrogen |
|---|---|---|---|---|---|---|---|---|
| ERT Section | 1 | 0.380 | 4700 | 4724 | 20.0 | 0.291 | 1600 | 0.704 |
|  | 2 | 0.380 | 4712 | 4927 | 20.0 | 0.284 | 2014 | 0.732 |
|  | 3 | 0.543 | 4820 | 5515 | 20.0 | 0.379 | 2240 | 0.818 |
|  | 4 | 2.365 | 5167 | 6305 | 20.0 | 1.484 | 2198 | 0.955 | stage. Appropriate near-equilibrium attainment time is provided in the ERT outlet and interconnecting piping.

The ERT unit 502 is approximately 40 feet in length and consists of sixteen heating screen stations (not shown) delivering a total heat input of about 260 kW. The Full Conventional ERT unit 502 is preferably vertical, to allow the gas flowing through the ERT to pneumatically convey the carbon with it, preventing or minimizing build up of carbon on the screens or on the walls of the ERT. The ERT unit preferably has four zones 508, 510, 512, 514 with four heating screen stations in each (not shown). The primary function of the first zone 508 is to heat the natural gas feed 504 in order to increase the rate of reaction. Due to the slow reaction rate at lower temperatures, minimal amounts of carbon and hydrogen are produced during this stage; therefore, the spacing between each heating screen station does not need to be very large and does not need to vary over the course of the zone. Once the carbon/gas mixture reaches temperatures over 1500° F., the reaction rate increases and noticeable amounts of carbon and hydrogen are produced: consequently, the remaining three zones 510, 512, 514 have larger spacing between each heating screen station than does the first zone. Preferably, the heat delivered by each heating screen station remains constant within each zone, which allows for some simplification in the design of the ERT unit 502. The heat delivered by each heating screen station in the first zone is preferably 30 kW. The total heat duties delivered by each subsequent zone preferably decreases. The heat delivered by each heating screen station in the second zone 510 is 22.5 kW, while the heat duty delivered in the third zone 512 is 9.5 kW. The heat duty delivered by each heating screen station in the final zone 514 is only 2.4 kW. The reaction rates and residence times necessary to achieve the desired conversion to hydrogen and carbon depend, at least in part, on the heating screen station spacing. Preferably, the heating screen station spacing varies continuously after the first zone 508 in order to maintain near isothermal conditions.

The finalizing stage is where the carbon/gas mixture is cooled and separated. First, the carbon/gas mixture passes through a quench cooling system 516 where quenching water 518 is injected. The products will exit the quench cooling system, preferably at a temperature of about 500° F. The products then go through a phase separator 520, such as a Venturi scrubber, where the carbon/gas mixture is cooled further by contacting with a circulating slurry of water and carbon. Make up water 522 is added to the phase separation system 524, thus cooling the products and creating slurry. The carbon settles on the bottom of the apparatus and exits as slurry. Samples can then be taken before sending the product carbon slurry on for drying and final carbon product production. The remaining 'cleaned gas' leaving the top of the phase separation apparatus substantially carbon-free, containing a mixture of methane and hydrogen comprises the hydrogen product.

Table 4 provides calculated volumes, flow rates, heat duties, residence times, outlet temperatures and outlet compositions for a sixteen section, single pass configuration. The associated equilibrium and operating curves are shown in FIG. 6.

TABLE 4

FULL CONVENTIONAL CONFIGURATION

|  | Section | Volume (ft$^3$) | Volumetric Flow In (ft$^3$/hr) | Volumetric Flow Out (ft$^3$/hr) | Heat Duty kW | Time (sec) | Outlet Temperature (° F.) | Outlet Mol Fraction Hydrogen |
|---|---|---|---|---|---|---|---|---|
| ERT Section | 1 | 0.054 | 4600 | 4600 | 30.0 | 0.043 | 1033 | 0.000 |
|  | 2 | 0.054 | 4600 | 4610 | 30.0 | 0.042 | 1527 | 0.002 |
|  | 3 | 0.054 | 4600 | 4680 | 30.0 | 0.042 | 1947 | 0.017 |
|  | 4 | 0.054 | 4640 | 4930 | 30.0 | 0.041 | 2294 | 0.075 |
|  | 5 | 0.380 | 4784 | 6650 | 22.5 | 0.240 | 2218 | 0.389 |
|  | 6 | 0.380 | 5714 | 7020 | 22.5 | 0.215 | 2256 | 0.554 |
|  | 7 | 0.380 | 6370 | 7710 | 22.5 | 0.195 | 2288 | 0.692 |
|  | 8 | 0.380 | 704 | 8000 | 22.5 | 0.315 | 2408 | 0.776 |
|  | 9 | 0.489 | 7520 | 8300 | 9.5 | 0.223 | 2372 | 0.836 |
|  | 10 | 0.489 | 7910 | 8380 | 9.5 | 0.216 | 2411 | 0.869 |
|  | 11 | 0.489 | 8140 | 8570 | 9.5 | 0.211 | 2462 | 0.898 |
|  | 12 | 0.489 | 8350 | 8740 | 9.5 | 0.206 | 2524 | 0.923 |
|  | 13 | 0.163 | 8550 | 8550 | 2.4 | 0.069 | 2564 | 0.923 |
|  | 14 | 0.163 | 8550 | 8690 | 2.4 | 0.068 | 2569 | 0.931 |
|  | 15 | 0.163 | 8612 | 8740 | 2.4 | 0.068 | 2578 | 0.939 |
|  | 16 | 1.537 | 8680 | 9180 | 2.4 | 0.620 | 2411 | 0.972 |

The Full Conventional configuration has several potential advantages.

Very high hydrogen purity may be achievable with this particular design.

The kinetics of this particular system favors both high temperatures and a long residence time in order to achieve high hydrogen purity.

The Full Conventional configuration can use near isothermal high temperatures to minimize residence time.

A minimal amount of equipment is required for particular embodiments of this configuration.

The quench cooling system that is used to cool the carbon/gas product is relatively inexpensive in comparison to a more complex and costly recycle system.

Embodiments of this particular configuration may be highly efficient in terms of energy input per amount of product produced for a full-scale industrial process.

The invention may be embodied in a variety of ways, for example, a system, method, device, etc.

The high-level heat energy capable of being produced by embodiments of the invention can be integrated into other electrical or chemical processes. Accordingly, the invention is not limited to the uses described above. As an example, the effluent can be used as a heat source for a solid oxide fuel cell.

Still further, the carbon produced can be used for various applications. For example, it can be used for molten carbonate fuel cells (MCFC). MCFCs use an electrolyte composed of a molten carbonate salt formed by mixing carbon or a carbon precursor with a salt.

As noted above, the ERT apparatus can be used for pyrolysis of hydrocarbons, such as ethane, propane, butane, naphtha, or any hydrocarbon feedstock that can be vaporized. In an illustrative example, an ERT apparatus analogous to that depicted in FIG. 5 is used to pyrolyze hydrocarbon gas. The hydrocarbon feedstock is preferably preheated to approximately 400° F. and then is fed through the ERT system. The heat produced by the ERT system pyrolyzes the hydrocarbon feedstock. The pyrolyzed gas is then passed through a quenching system, preferably immediately after exiting the ERT apparatus. The resulting cracked gas products then undergo separation using conventional separation methods. Hydrogen, methane, and various $C_2$, $C_3$, $C_4$, $C_5$ and heavier components can be separated and heat recovered. The separated hydrogen can be recycled in the system. In a preferred embodiment, the pyrolysis system is designed for lesser pressure and lesser residence times than the systems used for decarbonization and the quenching of the gases exiting the ERT is designed for minimum residence time to stop free-radical chemical reactions rather than to allow additional time for the gases to approach equilibrium as in the decarbonization systems. Further, the gas processing time-temperature relationship can be managed in pyrolysis modes to optimize economically the cracked gas product spectrum. In pyrolysis operations, steam may be added to the feedstock as it serves to reduce hydrocarbon partial pressure thereby enhancing yield spectra and it may reduce any tendency for carbon formation. A minimal amount of carbon monoxide and carbon dioxide will form but the short residence time will tend to preclude much steam reforming of the hydrocarbon feedstock.

An illustrative ERT apparatus is approximately six feet long, having approximately sixteen screens, each separated by proximately four inches.

While the invention has been described by illustrative embodiments, additional advantages and modifications will occur to those skilled in the art. Therefore, the invention in its broader aspects is not limited to specific details shown and described herein. Modifications, for example, to particular pressure and temperature used; number, size and configurations of screens and ERT units; and types of cooling, phase separation, scrubbing, filtration, and drying systems used may be made without departing from the spirit and scope of the invention. Accordingly, it is intended the invention not be limited to the specific illustrative embodiments, but be interpreted within the full spirit and scope of the described inventions it equivalents. It is further noted that the description of each of the three illustrative configurations, are themselves illustrative embodiments of the particular configuration.

The invention claimed is:

1. A method for producing hydrogen comprising:
   feeding a hydrocarbon gas into an electric reaction technology system having electric resistance heaters to decompose the hydrocarbon gas to hydrogen gas and carbon solids, the electric reaction technology system comprising one or more heating zones, wherein each heating zone comprises one or more heating stations and each heating station comprises one or more heating screens;
   selecting heat input into heating stations and spacing between heating stations to optimize hydrocarbon gas conversion to hydrogen gas and carbon solids;
   after passing the hydrogen gas through the electric reaction technology system, cooling the hydrogen gas and any remaining carbon solids and hydrocarbon gas;
   flowing the hydrogen gas and any remaining carbon solids and hydrocarbon gas though a phase separation system to remove substantially all of the carbon; and
   flowing the hydrogen and any remaining carbon solids and hydrocarbon gas out of the system.

2. The method of claim 1 wherein the temperature of the hydrogen and any remaining carbon and hydrocarbons leaving the electric reaction technology system is in the range of about 2000° F. to about 2700° F.

3. The method of claim 1 further comprising utilizing heat generated from the electric reaction technology system to heat the incoming hydrocarbon gas feed.

4. The method of claim 3 wherein the hydrocarbon gas feed is heated by the heat generated from the electric reaction technology system to a temperature in the range of about 800° F. to about 1200° F.

5. The method of claim 3 wherein the heat generated from the electric reaction technology system is utilized to heat the incoming hydrocarbon gas feed by:
   flowing the hydrocarbon gas into a heat exchanger; and
   flowing the heated hydrogen gas and any remaining carbon solids and hydrocarbon gas through the heat exchanger to heat additional incoming hydrocarbon gas.

6. The method of claim 1 further comprising:
   flowing the heated hydrogen gas and carbon solids through a carbon removal component after each heating zone to remove some or all of the carbon solids.

7. The method of claim 1 further comprising:
   pre-heating the hydrocarbon gas flow prior to feeding it into the electric reaction technology system or heat exchanger.

8. The method of claim 7 wherein the temperature increase of the hydrocarbon gas flow from the pre-heating step is in the range of about 250° F. to about 600° F.

9. The method of claim 1 further comprising:
   adding water to the hydrogen gas and any remaining carbon solids and hydrocarbon gas in the phase separation system to create a slurry containing substantially all of the carbon.

10. The method of claim 1 further comprising:
    recycling at least a portion of the heated hydrogen gas and any remaining carbon solids and hydrocarbon gas exiting the heat exchanger into the hydrocarbon gas flow.

11. The method of claim 10 wherein the ratio of recycled hydrogen to non-recycled hydrogen is in the range of about 2:1 to about 4:1.

12. The method of claim 10 comprising:
    flowing the hydrogen gas to be recycled through a recycle compressor.

13. The method of claim 1 further comprising flowing the heated hydrogen gas and any remaining carbon solids and hydrocarbon gas through a quench system after exiting the electric reaction technology system and prior to entering the phase separation system.

14. The method of claim 1 further comprising powering the system with electricity generated by wind.

15. The method of claim 1 wherein the hydrocarbon is methane.

16. The method of claim 1 wherein one or more heating stations delivers a different heating duty to the system.

17. The method of claim 1 wherein four zones are provided.

18. The method of claim 1 wherein at least one zone has four heating stations.

19. The method of claim 1 wherein the exit temperature at each heating zone is at least about 50° F. greater than the equilibrium temperature at the corresponding exit concentration of hydrogen.

20. The method of claim 1 wherein the electric reaction technology system is disposed in a substantially vertical position with respect to the level ground.

21. The method of claim 1 wherein the electric reaction technology system is disposed in a substantially horizontal position with respect to the level ground.

22. The method of claim 1 wherein the spacing between heating stations increases in the gas flow direction.

23. The method of claim 1 wherein the heat duty delivered by each heating station is substantially equal.

24. The method of claim 1 wherein the heat duty delivered by each heating station is substantially constant within each zone.

25. The method of claim 24 wherein the heat duty delivered by each subsequent zone decreases.

26. The method of claim 1 wherein the heat duty delivered by all zones is constant.

27. The method of claim 1 wherein the heating station spacing varies continuously after the first zone to maintain substantially isothermal conditions.

28. The method of claim 1 wherein the temperature varies between heating zones.

29. The method of claim 1 wherein the difference between the temperature of the flow entering a heating station and the temperature of the flow exiting the heating station is in the range of about 125° F. to about 175° F.

30. The method of claim 1 further comprising one or more near-equilibrium attainment zones following each electric reaction technology unit.

31. The method of claim 1 further comprising:
utilizing the heat energy from the electric reaction technology system as a heat source for a solid oxide fuel cell.

32. A method comprising:
generating carbon solids by carrying out the method as recited in claim 1;
utilizing the generated carbon as a component of a molten carbonate fuel cell.

33. The method of claim 1 wherein hydrogen is added to the hydrocarbon gas prior to entrance to the electric reaction technology system.

34. The method of claim 1 wherein the residence time increases for each heating station.

35. The method of claim 1 wherein the residence time decreases for each heating station.

36. The method of claim 1 wherein the residence time increases for each heating station in a first section of the reaction technology system and then decreases for the remaining heating station(s).

37. The method of claim, 1 wherein further comprising:
choosing residence times to maintain substantially isothermal conditions.

* * * * *